United States Patent

Huebner et al.

[15] 3,658,590

[45] Apr. 25, 1972

[54] AUTOMATIC VEHICLE WASHING APPARATUS

[72] Inventors: James A. Huebner, 2525 North Bourbon Street, Orange, Calif. 92667; Robert J. Wrighton, 7003 Encinita Street, San Gabriel, Calif. 91775

[22] Filed: Feb. 27, 1970

[21] Appl. No.: 15,087

[52] U.S. Cl. ...............134/32, 134/45, 134/57 R, 134/58 R, 134/123
[51] Int. Cl. ...........................................B08b 3/02
[58] Field of Search ..............334/7, 32, 34, 45, 123, 57 R, 334/58 R; 15/DIG. 2

[56] References Cited

UNITED STATES PATENTS

| | | | |
|---|---|---|---|
| 2,708,446 | 5/1955 | Phillips | 134/123 X |
| 3,368,572 | 2/1968 | Capra | 134/123 |
| 3,495,287 | 2/1970 | Freimanis | 134/123 X |
| 2,558,472 | 6/1951 | Wilcox | 134/58 X |
| 2,699,792 | 1/1955 | Fischer | 134/123 X |
| 3,038,481 | 6/1962 | Brechtel | 134/123 X |
| 3,241,167 | 3/1966 | Murillo et al. | 15/DIG. 2 |
| 3,315,691 | 4/1967 | Widner | 15/DIG. 2 |
| 3,428,983 | 2/1969 | Seakan | 15/DIG. 2 |

FOREIGN PATENTS OR APPLICATIONS

| | | | |
|---|---|---|---|
| 672,902 | 3/1966 | Belgium | 134/123 |
| 760,256 | 6/1967 | Canada | 134/123 |
| 1,059,920 | 2/1967 | Great Britain | 134/45 |
| 828,273 | 2/1960 | Great Britain | 15/DIG. 2 |

Primary Examiner—Morris O. Wolk
Assistant Examiner—Joseph T. Zatarga
Attorney—Beehler & Arant

[57] ABSTRACT

A vehicle washing apparatus mounted in a filling station bay, comprising a pneumatically operated system of a moving truck which carries a spray bar and travels parallel to the vehicle a distance equal to the vehicle's wheelbase, and causes the spray bar to rotate downwardly at the end of each traverse of the vehicle wheelbase. The front pivot station for the rotation of the spray bar is fixed at one location, and the rear pivot station is determined by the location of the vehicle's rear wheel on a series of rear wheel trip plates. The washing fluids are expelled from the spray bar under the urging of compressed air in the fluid reservoirs.

9 Claims, 11 Drawing Figures

Patented April 25, 1972 3,658,590
8 Sheets-Sheet 1
FIG.—1
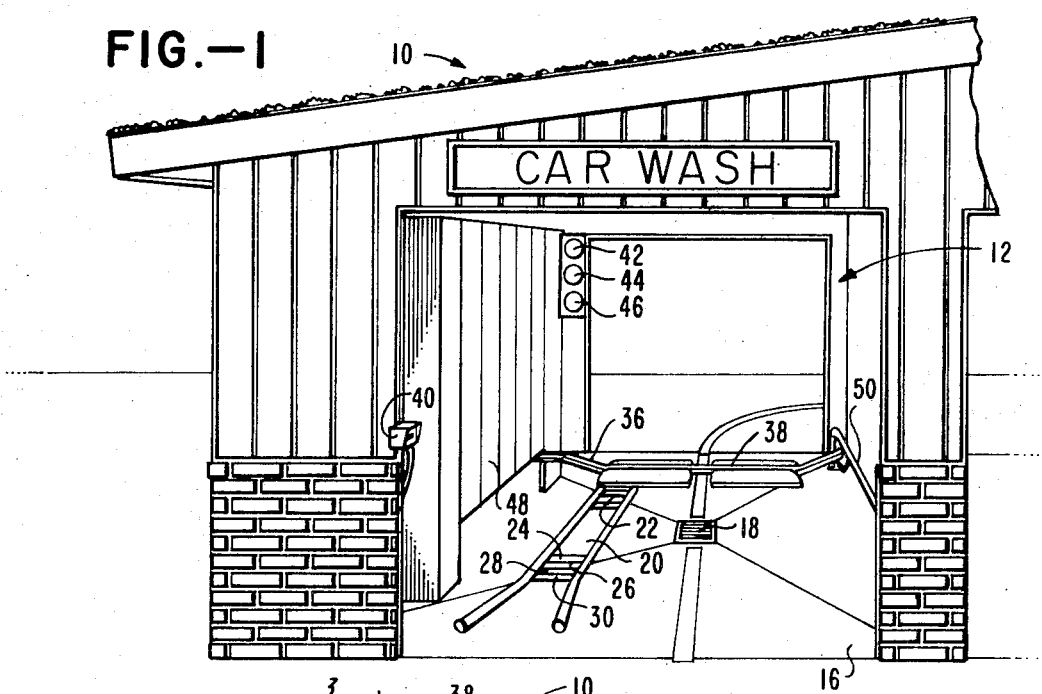
FIG.—2
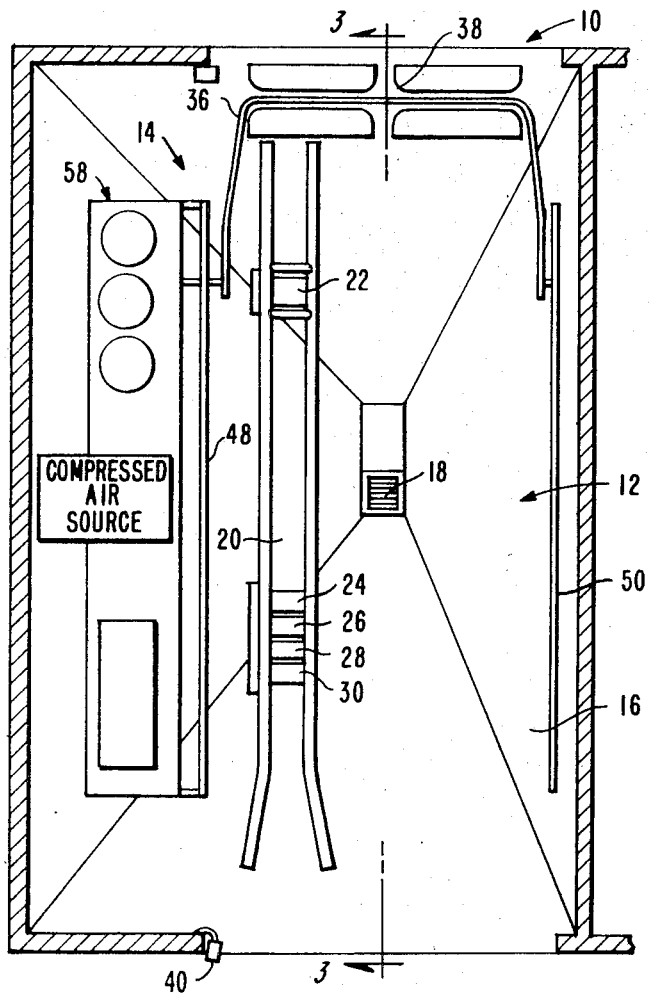
INVENTORS
JAMES A. HUEBNER
ROBERT J. WRIGHTON
BY Bruce A. Jogger
Bechler & Arant
ATTORNEYS Patented April 25, 1972
3,658,590
8 Sheets-Sheet 2
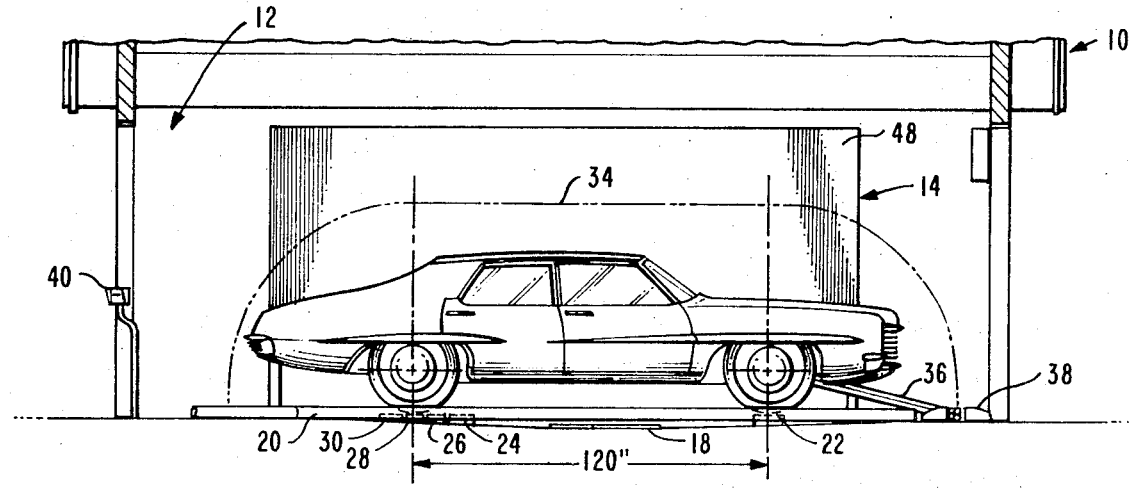
FIG.—3
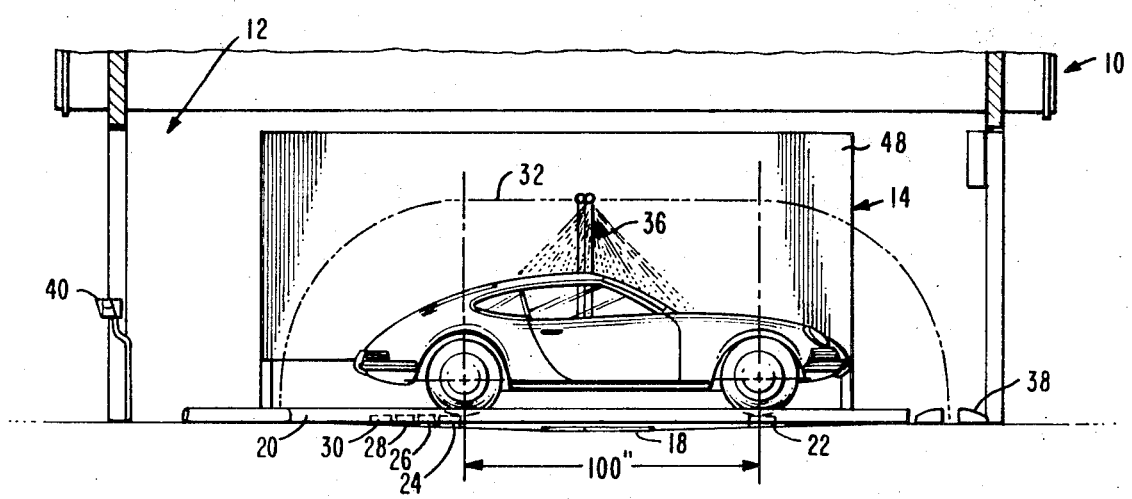
FIG.—4
INVENTORS
JAMES A. HUEBNER
ROBERT J. WRIGHTON
BY Bruce A. Jagger
Bechler & Arant
ATTORNEYS

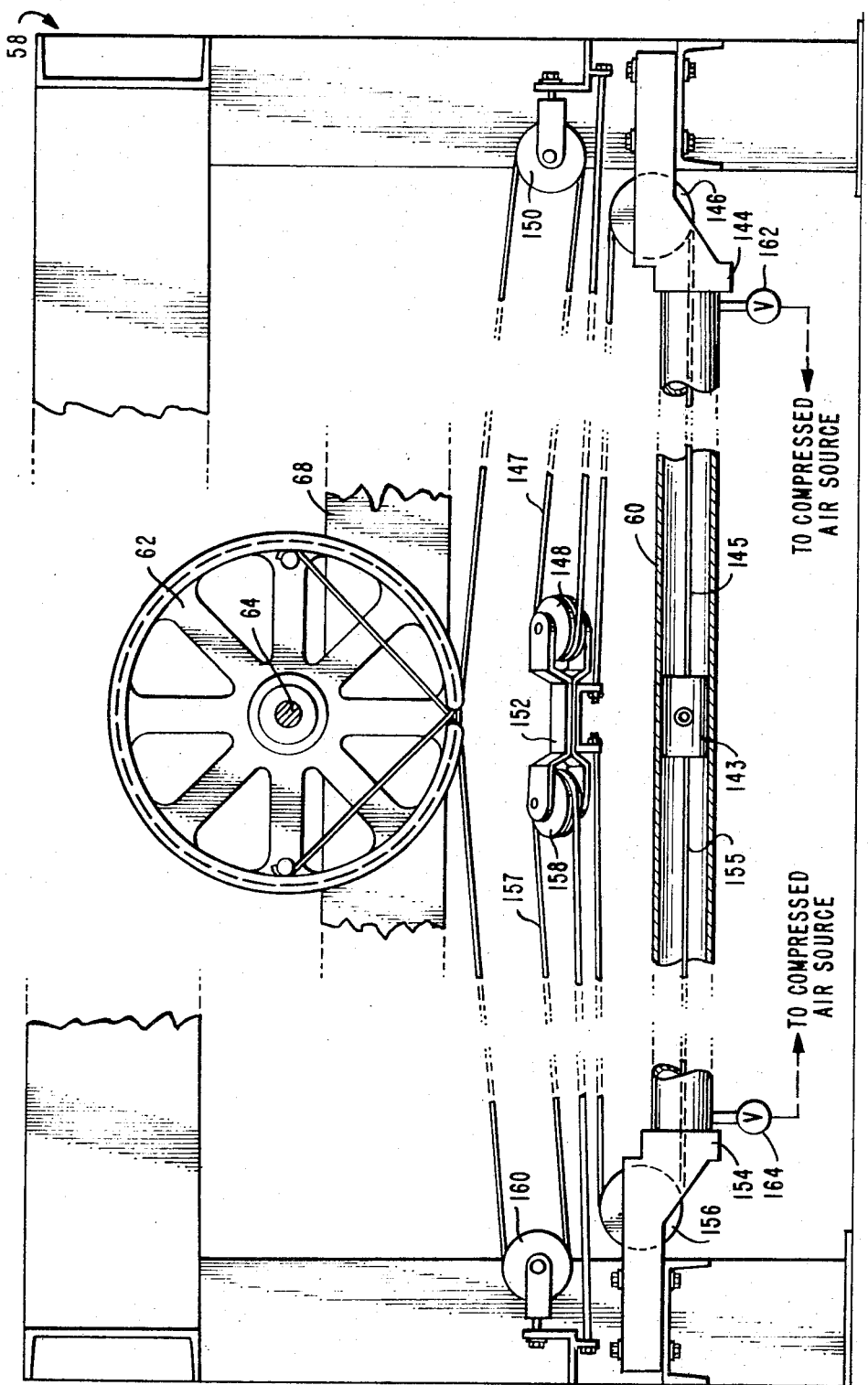

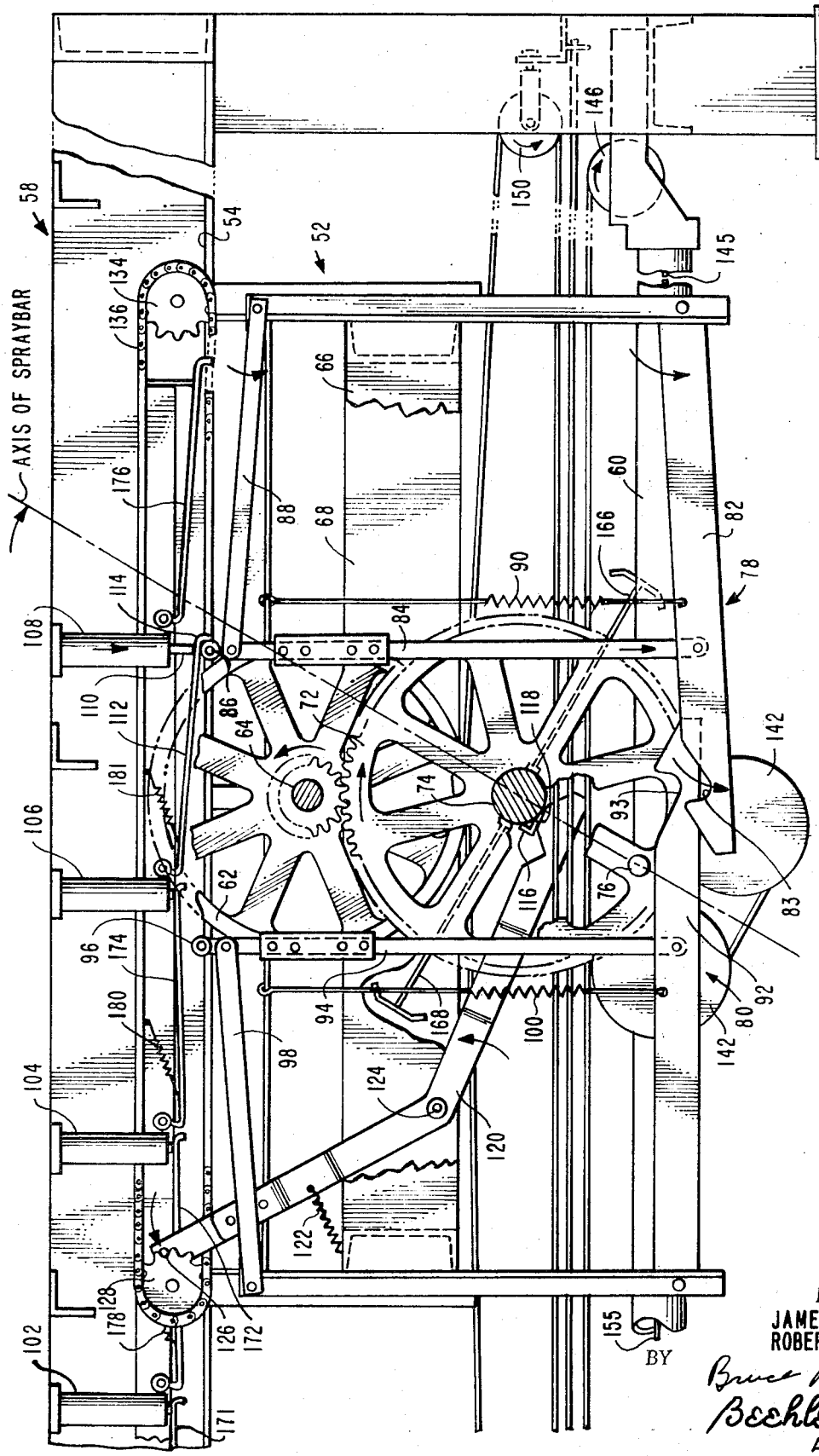

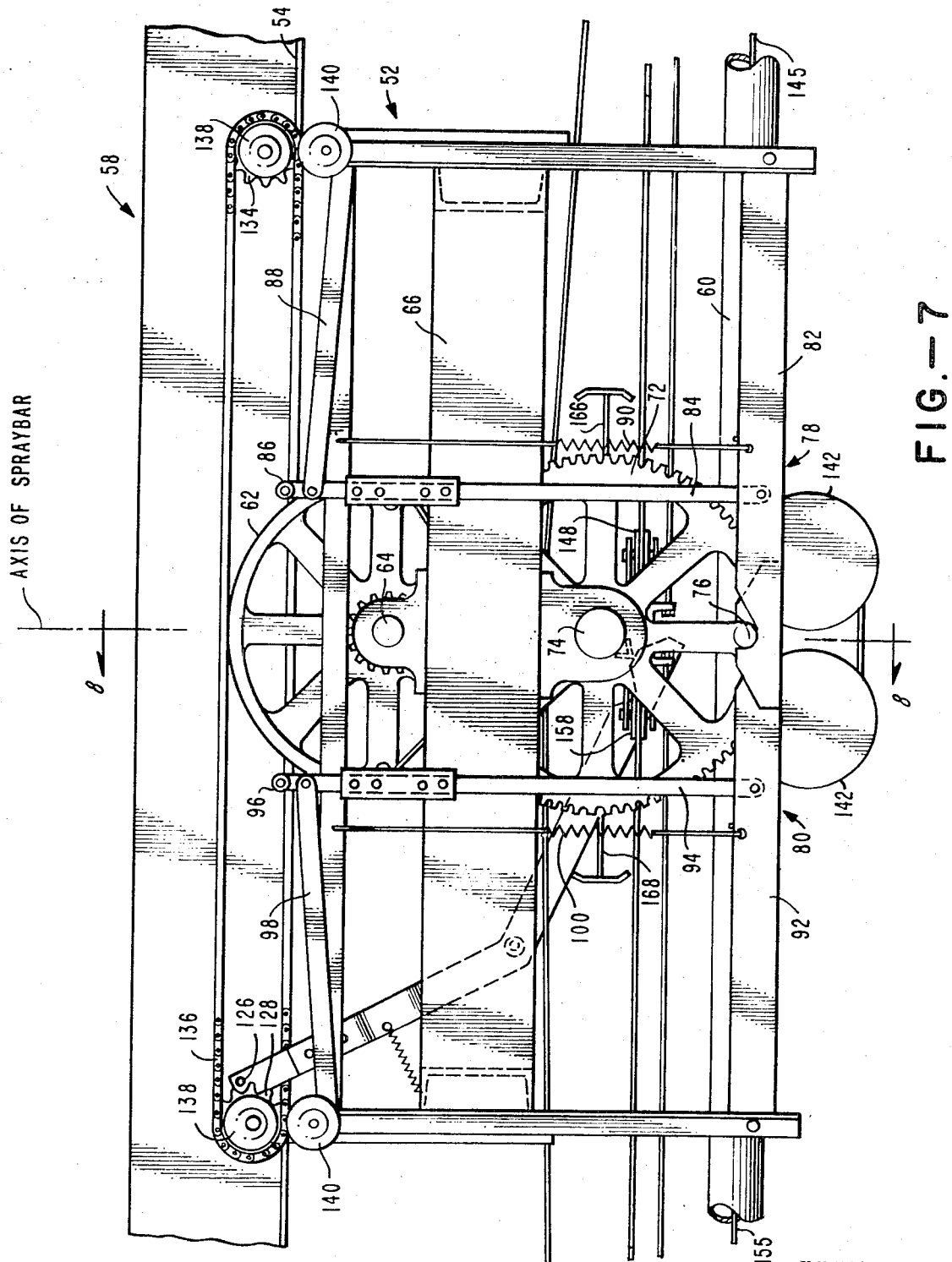

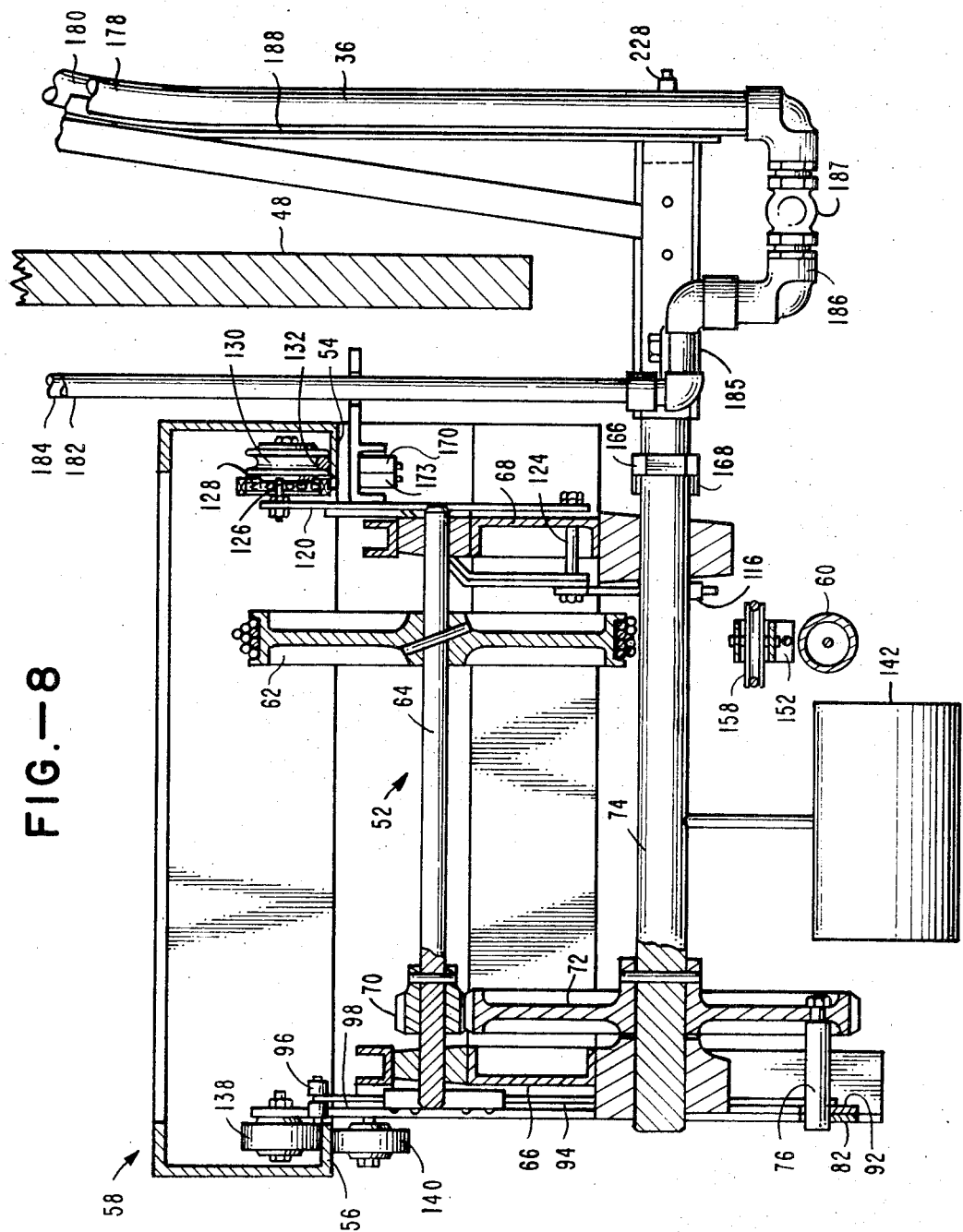

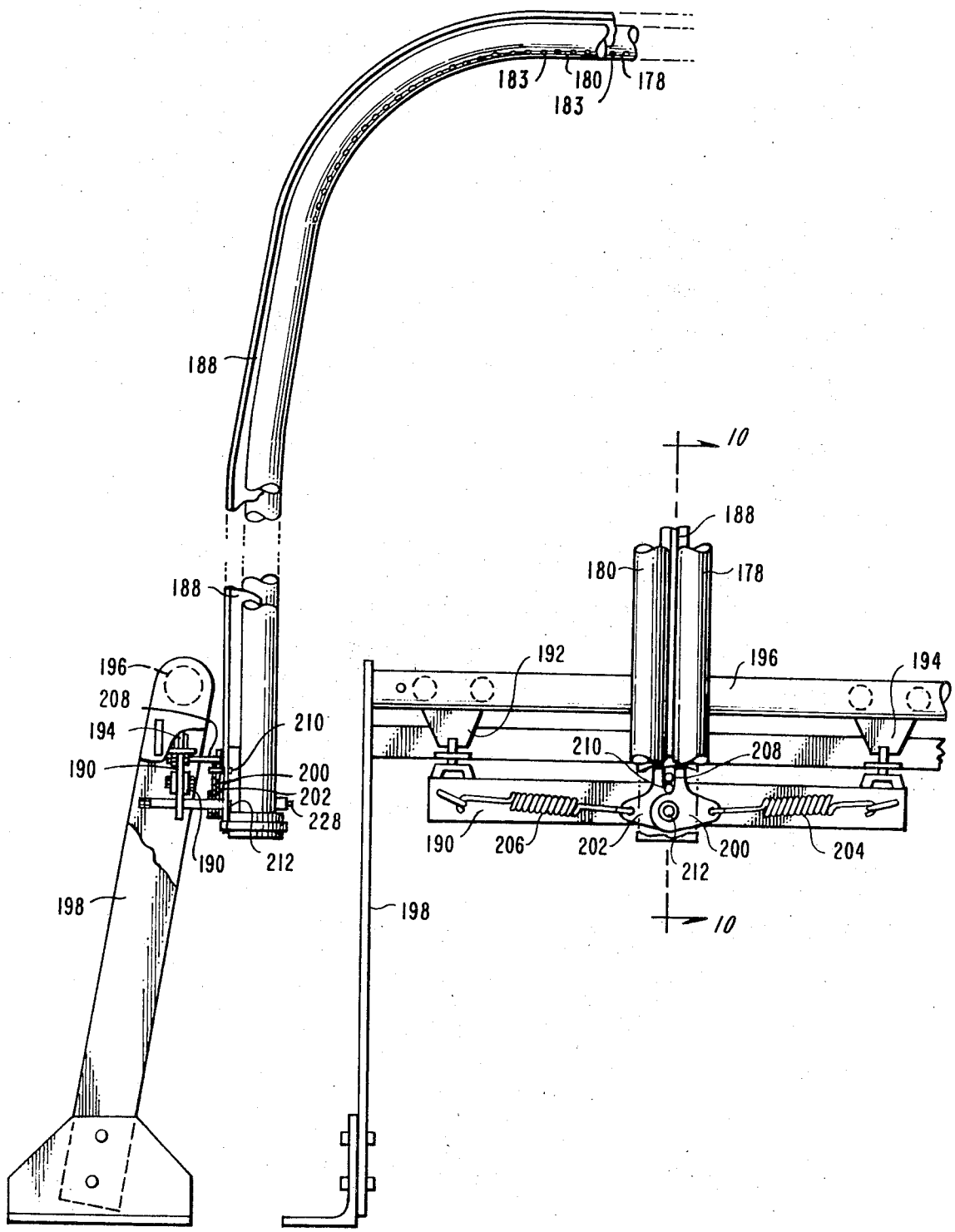

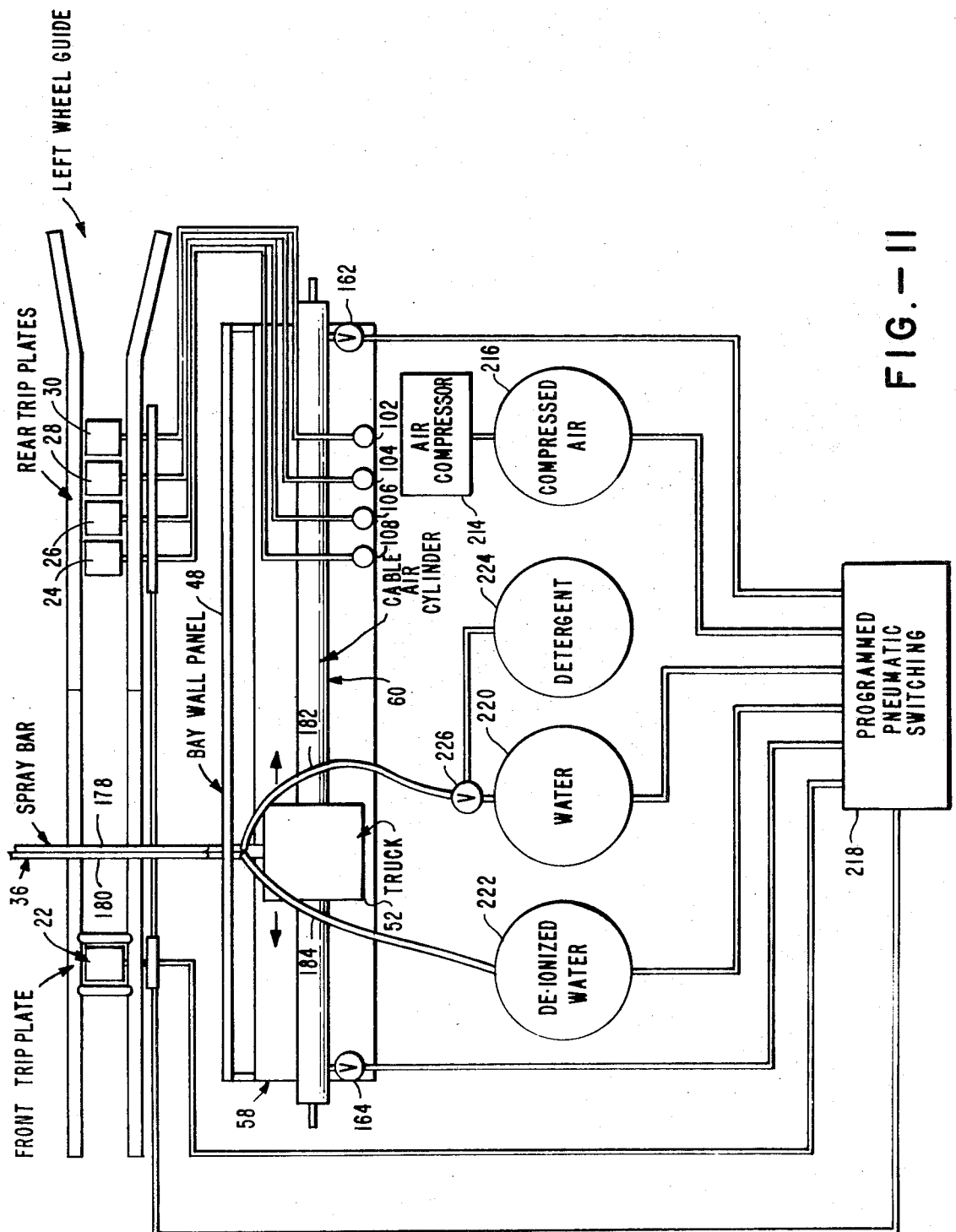

AUTOMATIC VEHICLE WASHING APPARATUS

This invention relates in general to a vehicle washing apparatus. More particularly, this invention relates to a vehicle washing apparatus in which the vehicle remains stationary, and a spray bar travels back and forth over the vehicle along a path, the length of which is automatically adjusted to the length of the vehicle.

Previously, automatic vehicle washing apparatus generally required specially constructed buildings to house them and required the installation of special electrical pumps, wiring, and accessories to operate them. Also, in those vehicle washing devices in which the vehicle remained stationary and the washing apparatus moved relative to the vehicle considerable difficulty had been encountered in accommodating different lengths of vehicles.

These and other disadvantages of the prior art have been overcome by way of the present invention. The present invention provides a pneumatically operated, automatic vehicle washing apparatus in which the vehicle is positioned relative to the washing apparatus with its wheels resting on trip plates, and a spray bar moves relative to the vehicle to accomplish the cleaning of the vehicle's surface. The trip plates actuate the washing mechanism and control the path length of the spray bar. The spray bar is carried by a spray bar truck back and forth along the length of the vehicle. The spray bar is generally U-shaped and is positioned over the vehicle with the open side of the U downwardly so that the spray bar arches over the vehicle. The spray bar is carried by the spray bar truck through the length of the wheelbase of the vehicle and is caused to pivot at each wheel from a generally vertical to a generally horizontal position and back to the generally vertical position. In one full cycle the spray bar starts, for example, at the front end of the vehicle in the generally horizontal configuration. As the washing mechanism is actuated, the spray bar rotates from the generally horizontal to the generally vertical position while the truck is stationary; the truck then travels the length of the wheelbase of the car to the rear wheel where the truck stops and causes the spray bar to pivot to the generally horizontal position. The mechanism then reverses itself and pivots back to the generally vertical position and the truck carries the spray bar back the length of the wheelbase of the car to the front wheel where the truck stops and the spray bar pivots down to the generally horizontal position again.

The entire washing apparatus, including the spray bar truck mechanism and the washing fluid system, is pneumatically operated so that there are no electrical systems involved. The washing apparatus is designed to be accommodated within a standard filling station bay so that no special structure is required to house it. The vehicle washing apparatus of this invention generally requires no special installations for its source of pneumatic pressure because filling stations conventionally have compressed air capabilities as a part of their normal equipment.

The length of the path traveled by the spray bar is limited to the length of the wheelbase of the vehicle by providing trip plates on which the wheels on one side of the vehicle may rest. The front wheel of each vehicle, regardless of the length of its wheelbase, is positioned on the single front plate, while a series of plates are provided for the rear wheel. These plates are connected to individual detent devices which co-operate with the truck to limit its travel to a location opposite the trip plate on which the rear wheel of the vehicle is positioned. One end of the spray bar is carried by a spray bar truck. The other end of the spray bar is carried by a track and carriage assembly. This track and carriage assembly merely serves to guide the spray bar while the truck moves and rotates the spray bar and carries the necessary conduits for supplying fluid to the spray bar.

The spray bar has two separate spray tubes, the first of which is for soapy water and tap rinse water under high pressure, and the second of which is used solely for deionized rinse water. The tap water and the deionized water are contained in separate tanks which are pressurized by means of compressed air. No pumps are used in supplying the washing fluids from their respective tanks to the spray bar. The spray bar has two fluid lines in it which run parallel throughout the length of the spray bar and are completely independent of one another. Thus, the tap water-detergent mixture can be supplied through one line and the deionized rinse water through another. The use of a tap water wash conserves the deionized water for the final wash. The deionized water is used as the last rinse to prevent spotting of the vehicle surface when it evaporates.

The truck which carries the spray bar is mounted within a steel framework at one side of the filling station bay. The moving truck is driven by a cable pneumatic air cylinder through a series of multipliers. The same cable pneumatic air cylinder also causes the spray bar to rotate from the vertical to the horizontal and back again at each end of the vehicle. The truck is provided with detents and a rotating mechanism which permit the spray bar to be held upright while the truck is moving and unlocked for rotation at each end of the truck's path of travel.

Referring particularly to the drawings, there is illustrated:

FIG. 1, a perspective of a conventional filling station bay having a washing apparatus of this invention therein;

FIG. 2, a plan view of the filling station bay of FIG. 1;

FIG. 3, an elevation of the interior of the filling station of FIG. 1 showing the path of a spray bar over a vehicle having a long wheelbase;

FIG. 4, an elevation similar to FIG. 3 showing the path of a spray bar over a vehicle having a short wheelbase;

FIG. 5, a schematic of a truck driving mechanism including a cable pneumatic air cylinder, cables, multipliers, and a driven drum on a truck;

FIG. 6, a broken side elevation of a truck;

FIG. 7, a side elevation of a truck;

FIG. 8, a sectional elevation taken along line 8—8 in FIG. 7;

FIG. 9, a side elevation of a track and carriage for the opposite end of the spray bar;

FIG. 10, a front elevation of the track and carriage of FIG. 9; and

FIG. 11, a schematic of a pneumatic system used to operate a washing apparatus of this invention.

As illustrated particularly in FIGS. 1 through 4, 10 is a conventional filling station structure having a drive through bay 12 located therein. A vehicle washing apparatus 14 is positioned entirely in bay 12. The bay floor 16 is provided with a sloping surface leading from all directions into drain 18. A vehicle wheel guide 20 is positioned on bay floor 16, and is adapted to receive and guide a pair of tandem aligned vehicle wheels into operative position with the vehicle washing apparatus 14. The vehicle wheel guide 20 includes several wheel trip plates for actuating and regulating the vehicle washing apparatus 14. The front wheel trip plate 22 is positioned so as to receive and support the front wheel of a vehicle. The first, second, third, and fourth rear wheel trip plates 24, 26, 28, and 30, respectively, are positioned at distances from front wheel trip plate 22 which correspond to the wheelbase lengths of most passenger automobiles.

As illustrated particularly in FIGS. 3 and 4, vehicles having different wheelbase lengths will all have their front wheels on front wheel trip plate 22 but will have their rear wheels positioned on different rear wheel trip plates depending upon their respective wheelbase lengths. The spray bar 36 travels along spray bar path 32 when first rear wheel trip plate 24 is depressed by the rear wheel of the vehicle and along spray bar path 34 when third rear wheel trip plate 28 is actuated by the rear wheel of the vehicle. The path traveled by the spray bar in each of spray bar paths 32 and 34 is exactly the same until it reaches the rear wheel of the vehicle, at which point it commences to rotate downwardly. As will be explained more fully hereinafter, the location of the vehicle's rear wheel on one of the rear wheel trip plates determines the point at which the spray bar will start to rotate downwardly. The spray bar is protected when it is in the down position by the guard 38 which receives the spray bar when it is in the most forwardly down position so as to permit vehicles to drive over it.

Conveniently, the filling station structure 10 is provided at the entry way to bay 12 with a coin-operated toll box 40. At the exit side of bay 12 there is provided, conveniently, a system of lights, much like a conventional traffic light, for the purpose of assisting the driver of the vehicle in positioning the vehicle wheels. Conveniently, the top light is a red light 42; the middle light is an amber light 44; and the bottom light is a green light 46. The electrical connections required for the operation of these lights and the coin-operated toll box are the only electrical installations employed in the vehicle washing apparatus 14.

One end of spray bar 36 is connected to an arm which projects outwardly into the washing area of bay 12 from underneath partition 48. The other end of spray bar 36 is carried by track 50. The mechanism which operates spray bar 36 is behind bay wall panel or partition 48.

The spray bar 36 is carried and rotated by truck 52. Truck 52 is suspended from and carried by overhead rails 54 and 56. Overhead rails 54 and 56 define the upper outer structural members of table 58. The truck 52 carries the spray bar and also causes it to rotate at the limits of the truck's travel. The spray bar is carried in the generally vertical position while it is traveling from one rotation point to another along the length of the vehicle's wheelbase. When the spray bar reaches the limit of the vehicle wheelbase, the horizontal motion of the truck 52 is halted and the spray bar begins to rotate. The truck 52 is driven longitudinally of the vehicle being washed, and the spray bar 36 is caused to rotate, by means of a cable pneumatic air cylinder 60 operating through a series of multipliers.

The cable pneumatic air cylinder 60 is coupled through cables and multipliers, as illustrated, for example, in FIG. 5, to a driven drum 62 which is mounted on and carried by truck 52. Driven drum 62 is rigidly mounted on rotatable drum shaft 64. Rotatable drum shaft 64 is journaled in bearings mounted on truck frame members 66 and 68, respectively. A small spur gear 70 is secured to rotatable drum shaft 64 in a position so as to intermesh with large spur gear 72. Large spur gear 72 is mounted on main shaft 74. Main shaft 74 is rotatably journaled in bearings mounted on truck frame member 66 and 68, respectively.

Large spur gear 72 has detent pin 76 mounted adjacent its periphery and projecting laterally from its face. Detent pin 76 is positioned so as to be engaged by detent mechanisms indicated generally at 78 and 80.

Detent mechanism 78, as illustrated particularly in FIGS. 7 and 8, includes a detent arm 82 which is pivoted at one end and free at the other end. Adjacent its other end, detent arm 82 is provided with a one-way notch 83 which is adapted to co-operate with detent pin 76 so as to prevent large spur gear 72 from rotating away from the free end of detent arm 82. One-way notch 83 is formed so that it does not prevent the rotation of large spur gear 72 towards that end of detent arm 82 which is pivotally mounted to the frame of truck 52.

Detent mechanism 80 is provided with a detent arm 92 which is mounted pivotally at one end to the frame of truck 52 and is provided adjacent to the other free end with a one-way notch 93. Detent arms 82 and 92 are identical except that they are mounted at opposite sides of the frame of truck 52 so that their free ends extend in opposite directions and pass one another at about the centerline of truck 52. The one-way notch 93 is adapted to co-operate with detent pin 76 so as to prevent the rotation of large spur gear 72 away from the free end of detent arm 92. One-way notch 93 offers no resistance to the rotation of large spur gear 72 towards the pivoted end of detent arm 92.

One-way notches 83 and 93 co-operate together to hold detent pin 76 so as to prevent the rotation of large spur gear 72 in either direction. The detent formed by the co-operation of one-way notches 83 and 93 is released by moving the outer ends of either detent arms 82 or 92 downwardly so that the respective one-way notch is released, and rotation of spur gear 72 away from the free end of the lowered detent arm is permitted. As illustrated particularly in FIG. 6, when the one-way notch 83 is released by the downward movement of the free end of detent arm 82, detent pin 76 is released and spur gear 72 rotates clockwise away from the free end of detent arm 82.

The respective detent arms 82 and 92 are attached adjacent their respective free ends to detent release arms 84 and 94, respectively. Detent release arms 84 and 94 are held in the generally vertical position by support arms 88 and 98, respectively. The support arms are both pivotally mounted at one end to the frame of truck 52 and at the other end to the respective detent release arm with which it is associated. The detent release arms 84 and 94 are pivotally mounted to the respective detent arms 82 and 92. The ends of the detent release arms 84 and 94 which are remote from their respective detent arms are provided with contact rollers 86 and 96. All of the joints between detent arms 82 and 92, detent release arms 84 and 94, support arms 88 and 98, and the attachment of detent arms 82 and 92 and support arms 88 and 98 to the frame of truck 52 are pivotal joints. Thus, the four-sided figure defined by detent arm 82, detent release arm 84, support arm 88, and the vertical frame member of truck 52 to which the detent arm 82 and the support arm 88 are attached define a four-sided figure which is not rigid. The detent arm 92, detent release arm 94, support arm 98, and the frame member of truck 52 to which detent arm 92 and support arm 98 are attached define a similar nonrigid four-sided figure. Return spring 90 biases detent arm 82 in a direction so that one-way notch 83 is urged into engagement with detent pin 76. Return spring 100 is similarly positioned so as to bias detent arm 92 in such a direction that one-way notch 93 engages detent pin 76.

A series of air cylinders 102, 104, 106, and 108, respectively, are mounted on table 58 at fixed locations. Each air cylinder is pneumatically connected to a single rear wheel trip plate so that the air cylinder is actuated to extend its plunger responsive to the presence of a vehicle tire on the trip plate with which it is associated. Trip plate 24 actuates air cylinder 102 so as to extend its plunger. Trip plate 26 actuates air cylinder 104; trip plate 28 actuates air cylinder 106; and trip plate 30 actuates air cylinder 108. The extention of one of the air cylinders plungers serves to project a detent actuating arm downwardly into a position to engage one of contact rollers 86 or 96, respectively. In FIG. 6 there is illustrated a configuration that would occur responsive to the presence of a vehicle tire on trip plate 30. Depression of trip plate 30 actuates air cylinder 108 to extend plunger 110 so as to move detent actuating arm 112 into a position where the hook 114 at the outer end of the detent actuating arm 112 projects downwardly, and as truck 52 reaches a position where main shaft 74 is aligned with trip plate 30, it engages roller 86. The engagement of arm 112 with roller 86 causes detent release arm 84 to move downwardly against the bias of return spring 90 so as to release detent pin 76. The release of detent pin 76 permits large spur gear 72 to rotate away from the free outer end of detent arm 82. This rotation of large spur gear 72 causes cam 116 to move off of cam point 118 on brake arm 120. Brake spring 122 causes brake arm 120 to pivot about the pivot point 124 so as to bring brake pin 126 into engagement with the teeth of sprocket 128, which positively locks sprocket 128 and prevents its rotation. As illustrated particularly in FIG. 8, sprocket 128 is rigidly mounted on a common shaft with guide roller 130 so that the presence of brake pin 126 intermeshed with teeth of sprocket 128 prevents the rotation of guide roller 130.

Guide roller 130 is mounted in engagement with and rides on a rod 132 which is welded to overhead rail 54. Sprocket 128 is positively linked to sprocket 134 at the other end of truck 52 by means of link chain 136. Sprocket 134 is similarly combined with a guide roller, not shown, like guide roller 130 so that the rotation of the second guide roller is also prevented by the presence of brake pin 126 in the teeth of sprocket 128. The other side of truck 52 is carried by sets of rollers 138 and 140 which are mounted to the frame of truck 52 and co-operate between them to grasp either side of rail 56 so as to prevent truck 52 from swaying or twisting so as to disengage itself from table 58.

The main shaft 74 carries the spray bar 36. The spray bar 36 is counterbalanced on main shaft 74 by means of a set of counterweights 142.

The truck is propelled and the spray bar rotation mechanism on the truck is driven by a cable pneumatic air cylinder 60. The cable pneumatic air cylinder 60 is rigidly mounted to table 58. The cable pneumatic air cylinder 60 contains a piston 143 which is attached on one side to cable 145 and on the opposite side to cable 155. The multipliers are symmetrically disposed on either side of the mid-point of cable pneumatic air cylinder 60. Cable 145 is attached to one end to piston 143 and passes axially of cable pneumatic air cylinder 60 and through pressure seal 144. Cable 145 passes over first pulley 146 which is mounted to table 58; from there it travels back to and terminates at pulley bracket 152. From pulley 148 a reach of cable 147 extends to pulley 150 which is mounted on table 58 adjacent the attachment of one end of cable 147; the last reach of the cable extends to and is wrapped around driven drum 62; and the second end of cable 147 is attached securely to driven drum 62. The second cable 155 extends axially of cable pneumatic air cylinder 60 from the opposite end of piston 143 through the second pressure seal 154 at the opposite end of cable pneumatic air cylinder 60, around pulley 156 which is mounted to table 58 forward to and terminates at movable pulley bracket 152. A reach of cable 157 then extends around pulley 158 and rearwardly to pulley 160 which is mounted to the frame of table 58; the last reach of cable 157 extends around driven drum 62; and the second end of cable 157 is securely attached to driven drum 62. The first end of cable 157 is attached to table 58.

As is apparent, particularly in FIGS. 5, 6, 7, and 8, piston 143 is free to move in either direction responsive to the presence of positive air pressure in one end or the other of cylinder 60. The movement of piston 143 causes both cables 145 and 155 to move. When detent pin 76 is locked in the detent formed by one-way notches 83 and 93, so as to prevent the rotation of large spur gear 72, small spur gear 70, and driven drum 62, the movement of piston 143 will cause the respective cables to pull the truck 52 along overhead rails 54 and 56.

When the detent, formed by one-way notches 83 and 93, is released, the movement of piston 143 causes the rotation of driven drum 62, which, through spur gears 70 and 72, causes main shaft 74 to rotate. The rotation of main shaft 74 causes brake pin 126 to engage with sprocket 128 and lock truck 52 against horizontal movement.

The main shaft 74 carries with it, as it rotates, limit arms 166 and 168. These limit arms are positioned on main shaft 74 so that they contact and actuate pneumatic reversing switches when the spray bar reaches the lower limit of its rotation. The limit switches are mounted side by side on the truck, and the limit arms 166 and 168 are displaced axially from one another so that one arm touches one limit switch at the lowest point of rotation at one end of truck's travel, and the other arm touches the other limit switch at the lowest point of rotation at the opposite end of the truck's travel. The pneumatic limit switch for the forward pivot station of the truck is indicated at 170 in FIG. 8. When the respective limit arms 166 or 168 contact a pneumatic limit switch, a signal is sent from programmed pneumatic switching station 218 to reverse the cable pneumatic air cylinder 60 so that piston 143 reverses its direction of travel. The reversal of the direction of travel of piston 143 causes the driven drum 62 to rotate in the opposite direction, thus raising the spray bar 36 back to its generally vertical configuration and bringing detent pin 76 back into engagement with either one-way notches 83 or 93. When the spray bar 36 has returned to its generally vertical configuration, the rotation of main shaft 74 brings cam 116 into contact with cam point 118 so as to disengage break pin 126 from the teeth of sprocket 128, thus permitting truck 52 to travel in the opposite direction from which it was traveling prior to reaching the rotation point of spray bar 36.

Referring particularly to FIG. 6, as soon as the brake pin 126 releases sprocket 128 and detent pin 76 is engaged with one-way notch 93, truck 52 begins to move away from air cylinder 108 so that hook 114 on detent actuating arm 112 is disengaged from contact roller 86 and detent release arm 84 moves upwardly under the urging of return spring 96 to engage one-way notch 83 with detent pin 76. The main shaft 74 is then securely locked against rotation so that spray bar 36 remains in its generally upright configuration until truck 52 reaches the opposite limit of its travel, and a detent actuating arm, not shown, engages roller 96 and depresses it so as to disengage one-way notch 93 and permit the rotation of large spur gear 72 away from the free end of detent arm 92. The rotation of main shaft 74 in co-operation with cam 116 and cam point 118 will result in the engagement of brake pin 126 with the teeth of sprocket 128, thus locking truck 52 against further motion.

When truck 52 is at the pivot station adjacent the rear wheel trip plates 24, 26, 28, and 30, it is engaged by the first of the detent actuating arms 171, 172, 174, 112, or 176 that is projecting downwardly into engaging position with roller 86. The detent actuating arms 171, 172, 174, and 112 are held up out of engagement with roller 86 by means of return springs, such as 178, 180, and 181. The last detent actuating arm 176 is permanently positioned so as to engage roller 86 if none of the other detent actuating arms do. Detent actuating arm 176 defines the rearward most point of travel for truck 52.

The spray bar 36, as illustrated particularly in FIGS. 8, 9, and 10, includes a deionized water supply tube 180 and a rinse water and detergent supply tube 178. The supply tubes 178 and 180 are provided with spray ports 183 through which fluid is discharged for the purpose of washing the vehicle. The supply tubes 178 and 180 are formed into a generally U-shaped configuration, the open end of which is adapted to straddle the vehicle which is being washed. Washing fluids are supplied to spray bar 36 by means of flexible fluid supply conduits 182 and 184. Flexible fluid supply conduit 184 supplies deionized water to supply tube 180, and flexible fluid supply conduit 182 supplies rinse water and detergent to supply tube 178. The flexible fluid supply conduits 182 and 184 are carried by an overhead trolley, not shown, which is pulled along its track by flexible fluid supply conduits 182 and 184 as truck 52 moves through the washing cycle. There is sufficient slack provided in flexible fluid supply conduits 182 and 184 so that the movement of truck 52 does not put sufficient tensile force on them to damage them. The flexible fluid supply conduits 182 and 184 are connected to the supply tubes 178 and 180 through fluid couplings. The fluid coupling 186 for supply conduit 182 and supply tube 178 is shown illustrated in FIG. 8. The fluid couplings are rigidly mounted to and rotate with main shaft 74. The supply tubes 178 and 180 are structurally supported by a T-bar 188 which is rigidly mounted to and rotatable with main shaft 74, as illustrated particularly in FIG. 8. A swivel couple is at 185.

The end of spray bar 36 which is remote from truck 52 is pivotally mounted on carriage member 190. Carriage member 190 is supported by carriers 192 and 194 from a track 196. Carriers 192 and 194 are free to move along track 196 responsive to force supplied to the other end of spray bar 36 by the movement of truck 52. The track 196 is supported by support bracket 198 in a position substantially parallel with and on the same level as main shaft 74. Spring biased trigger members 200 and 202 are biased by springs 204 and 206 into engagement with pin 210. The trigger members 200 and 202 are mounted on carriage member 190 and pin 210 is mounted on T-bar 188. T-bar 188 is mounted for rotation about pivot shaft 212. Pivot shaft 212 is generally axially aligned with main shaft 74. The pivot shaft 212 also carries trigger members 200 and 202. Pivot shaft 212 is mounted to carrier member 190. Thus, when truck 52 moves, the opposite end of spray bar 36 moves with it and drives carriage member 190. When the forward motion of 152 is halted at a pivot station, the carriage member 190 stops, and spray bar 36 is permitted to rotate on pivot shaft 212. While the truck 52 is moving between pivot stations, spray bar 36 is urged to retain its generally upright position by the co-operative action of trigger members 200 and 202 on pin 210. Pin 208 is mounted on carriage member 190 and retains trigger members 200 and 202 in place.

The vehicle washing apparatus is actuated and regulated solely by compressed air. The schematic of the pneumatic system is illustrated particularly in FIG. 11. An air compressor or other source of compressed air 214 supplies air to a large reservoir of compressed air 216. Compressed air for the operation of the vehicle washing system is supplied from reservoir 216 to a programmed pneumatic switching station 218. The separate elements of the pneumatic system are conventional, commercially available devices and do not constitute, individually by themselves, a part of this invention. Compressed air from station 218 pressurizes tap water tank 220 and deionized water tank 222 to a sufficient pressure so that the washing fluid is supplied to and ejected from spray bar 36 solely under the urging of this pressure and without the necessity of employing any pumps. Detergent is supplied to a valve 226 from detergent container 224. It is not necessary to pressurize detergent container 224 because detergent may be drawn through valve 226 by a venturi effect; however, container 224 may be pressurized if desired.

The presence of a vehicle front wheel on trip plate 22 signals station 218 that the washing cycle is ready to begin. The presence of a vehicle rear wheel on one of rear trip plates 24, 26, 28, or 30 actuates one of the air cylinders 102, 104, 106, or 108 so as to define the rear pivot station for truck 52. The reversing valve in switching station 218 for the air cylinder is pneumatically responsive to the contact of the limit arms 166 and 168 with the respective pneumatic limit switches when the spray bar 36 has pivoted downwardly to its lowest position at each pivot station. A cycle of the spray bar starts with the spray bar at its lowest point at one pivot station. The spray bar rotates upward to the generally vertical position, and the cable pneumatic air cylinder 60 propels the truck 52 along its path and drives the spray bar through the downward portion of its rotation cycle. The air cylinder is then reversed by switching station 218 and drives in the other direction which first rotates the spray bar from its lowest point up to its vertical and locked position and then drives the truck to its next pivot station and rotates the spray bar down to its lowest point. Contact of a limit arm with a pneumatic limit switch at this lowest point will cause the air cylinder to reverse and the cycle is ready to repeat itself.

In a typical washing cycle a spray bar begins with the truck at the forward pivot station with the main shaft 74 aligned with front wheel trip plate 22 and spray bar 36 at its lowest point nestled within spray bar guide 38. As the vehicle to be washed approaches vehicle wheel guide 20, green light 46 is lit. A coin is deposited in coin-operated toll box 40, and amber light 44 comes on. The vehicle proceeds until its left front wheel is resting upon front wheel trip plate 22, whereupon red light 42 comes on, and the washing cycle begins. Station 218 orders tap water and detergent to be supplied through supply conduit 182 to supply tube 178, and valve 162 is opened so that compressed air flows into cable pneumatic air cylinder 60 on one side of piston 143. Since one-way notch 93 is disengaged from detent pin 76 and brake pin 126 is engaged with the teeth on sprocket 128, truck 52 remains stationary at its forward pivot point, and the spray bar 36 rotates upwardly out of spray bar guide 38 towards its generally vertical position. As detent pin 76 engages one-way notch 83, the rotation of spray bar 36 ceases, and brake pin 126 is disengaged from sprocket 128 so that truck 52 begins to move rearwardly of the vehicle away from its front pivot point and towards its rear pivot point. Truck 52 travels the entire wheelbase of the vehicle between its front and rear pivot points with the spray bar locked in its vertical configuration, spraying a mixture of water and detergent over the vehicle as it proceeds. Upon reaching the rear pivot point, with the main shaft 74 aligned generally coaxially with the rear axle of the vehicle, the contact roller 86 is engaged by one of the detent actuating arms 171, 172, 174, 112, or 176. The detent actuating arm which engages roller 86 is determined by the length of the wheelbase of the vehicle as sensed by one of trip plates 24, 26, 28, or 30 and transmitted through station 218 to actuate the appropriate air cylinder 102, 104, 106, or 108. The action of the detent actuating arm acting through detent release arm 84 lowers the free outer end of detent arm 82 and releases one-way notch 83 so that main shaft 74 begins to rotate with spray bar 36. Brake pin 126 engages the teeth of sprocket 128, thus locking truck 52 against any further rearward motion. Spray bar 36 continues to rotate downwardly and rearwardly until limit arm 168 contacts a pneumatic limit switch 173 and causes the direction of travel of piston 143 to be reversed in cable pneumatic air cylinder 60. The direction of rotation of main shaft 74 then reverses, and spray bar 36 is rotated upwardly and forwardly to its generally vertical configuration, whereupon brake pin 126 releases sprocket 128 and truck 52 begins to travel forwardly along the length of the wheelbase of the vehicle. When truck 52 reaches a pivot station opposite front wheel trip plate 22 where main shaft 74 is generally coaxially aligned with the front axle of the vehicle being washed, a fixed detent actuating arm, not shown, contacts and coacts with contact roller 96 to release one-way notch 93 so as to permit large spur gear 72 to rotate away from the free outer end of detent arm 92, thus lowering spray bar 36 forwardly and downwardly to its lowest position, whereupon limit arm 166 contacts pneumatic limit switch 170 so that the direction of piston 143 is again reversed. All during this cycle, the spray bar 36 has been discharging a mixture of water and detergent. As the second full cycle begins, the programmed pneumatic switching station 218 orders a cessation of all fluid flow to spray bar 36, and the truck 52 moves rearwardly to the rear pivot station, and the spray bar pivots down to its most rearwardly, downwardly position with no fluid being discharged from spray bar 36. This permits the soap or detergent to act on the dirt and grime covering the vehicle. Upon reaching its most rearwardly and downwardly position, the switching station 218 actuates a straight tap water wash so that only high pressure tap water is being discharged from supply tube 178. The tap water rinse continues while the truck travels the length of the wheelbase twice. When the truck returns to the rear pivot point and the spray bar is at its lowest, most rearwardly position, the switching station 218 discontinues the high pressure tap water rinse and actuates the deionized water rinse which flows through fluid supply conduit 184 from deionized water tank 222 into deionized water supply tube 180. The spray bar makes one pass from rear to front, spraying deionized water on the vehicle. The spray bar returns to its most forwardly, downwardly position nestled within spray bar guide 38, and pneumatic switching station 218 turns the automatic car washing device off, and green light 46 comes on alerting the driver to the fact that he may now drive his freshly washed vehicle out of the filling station bay.

The reservation of the deionized water supply tube 180 for only deionized water makes it possible to provide a water rinse which will dry spot free on the vehicle, thus eliminating the necessity for blowers or hand drying.

The valves 162 and 164 are pressure relief valves that keep pressure from dropping below a predetermined value on either side of piston 143. Thus, if spray bar 36 jams and then breaks loose, the pressure on either side of piston 143 will be somewhat equalized to prevent spray bar 36 from leaping suddenly along its path of travel due to a great drop of pressure on one side of piston 143.

The gear reduction in truck 52 permits the spray bar 36 to be rotated at the same rate as the forward travel of truck 52. When truck 52 is traveling horizontally the spray bar 36 is moving at twice the speed of piston 143. When truck 52 stops and main shaft 74 starts to rotate the gear reduction of the spray bar rotating mechanism on truck 52 permits spray bar 36 to continue moving along the arcuate convex portion of its longitudinal path at about the same rate as it was traveling along the straight portion of the path.

The coin box may, if desired, be a mechanical box which actuates a pneumatic switch. In this event the only electrical device used in the system is the lights employed to tell the driver of the vehicle when to proceed and when to stop.

The spray ports 183 may conveniently be nozzles threaded into the supply tubes, which nozzles provide a flat fan-shaped spray. In one embodiment the supply tube 180 has nine such nozzles, and supply tube 178 has 13 such nozzles.

The nozzles 228 are preferably designed so that they produce a spray pattern which covers the entire wheel of the vehicle. The spray pattern may, for example, be square.

The fluid coupling 186 preferably includes a check valve 187 which prevents draining the entire system when spray bar 36 is at rest in spray bar guide 38.

The lights 42, 44, and 46 may be used as colored lights, as described hereinabove, or they may be used as lighted signs, such as, for example, stop, enter, and exit, respectively.

The mixture of water and detergent may be supplied as a liquid admixture to spray ports 183 or it may be admixed with air before being projected onto the vehicle's surface. Admixing the detergent and water with air produces a very effective washing foam.

As will be understood by those skilled in the art, what has been described are preferred embodiments in which modifications and changes may be made without departing from the spirit and scope of the accompanying claims.

We claim

1. A pneumatically operated vehicle washing apparatus comprising:
   a source of pneumatic pressure for operating said apparatus;
   a programmed pneumatic switching station means controllably connected with said apparatus and said source of pneumatic pressure for automatically controlling the operation of said washing apparatus;
   a plurality of vehicle washing fluid reservoirs operatively included in said apparatus;
   means in pressurizing connection with said source of pneumatic pressure and said washing fluid reservoirs for applying said pneumatic pressure to the washing fluids contained in said reservoirs;
   spray bar means connected with said washing fluid reservoirs for receiving pressurized washing fluids from said reservoirs and discharging said pressurized fluids against the surface of a vehicle, said spray bar means being adapted to extend laterally over said vehicle;
   pneumatically operated means for carrying said spray bar means along a reciprocal path, which path is generally parallel to the wheelbase of said vehicle, said means for carrying including means for moving said spray bar means longitudinally along said path while preventing the rotation of said spray bar means and means for preventing the longitudinal movement of said spray bar means while rotating said spray bar means arcuately over the ends of said vehicle at either end of said path; and
   sensing means operatively connected with said programmed pneumatic switching station means for automatically sensing the length of said wheelbase and controlling the length of said path proportionate to the length of said wheelbase.

2. A vehicle washing apparatus of claim 1 wherein the spray bar means is generally U-shaped with one free end being carried by the pneumatically operated means for carrying, and the other free end being supported by a free moving carriage means, said spray bar means including a plurality of fluid supply conduits having fluid discharge ports therein, at least one of said fluid supply conduits being adapted to receive and discharge only deionized water, said fluid supply conduits being connected with the washing fluid reservoirs.

3. A vehicle washing apparatus comprising:
   spray bar means in the form of an inverted U, having a plurality of fluid discharge ports, movably positioned so as to discharge a plurality of washing fluids onto the surface of a stationary vehicle located between the legs of said U-shaped spray bar, said spray bar means being positioned so as to arch laterally over said vehicle;
   supply means operatively connected to said spray bar means for separately supplying a plurality of washing fluids to said spray bar means;
   pressurizing means operatively associated with said supply means for pressurizing the washing fluids supplied to said spray bar means;
   truck means longitudinally movable relative to said vehicle for carrying said spray bar means along a path, said path being generally parallel with the longitudinal axis of said vehicle, a leg of said U-shaped spray bar means being pivotally mounted on said truck means adjacent the free end of said leg;
   sensing means controllably associated with said truck means for sensing the length of the wheelbase of said vehicle and automatically adjusting the distance traveled by said truck means to about the length of said wheelbase, the distance traveled by said truck being substantially limited to and coextensive with said wheelbase; and
   positioning means operatively associated with said spray bar means for rotating said spray bar means on said truck means arcuately over the respective ends of said vehicle from a generally vertical position to a generally horizontal position and back to a generally vertical position when said truck means is located at about the respective end limits of the distance traveled by said truck means, said positioning means holding said spray bar means in a generally vertical position on said truck means when said truck means is between the said respective end limits of its travel.

4. A vehicle washing apparatus of claim 3 including means operatively associated with the truck means for stopping the motion of said truck means along the path and holding said truck means at a location adjacent a wheel of said vehicle as said spray bar rotates from a generally vertical position to a generally horizontal position and back to a generally vertical position.

5. A vehicle washing apparatus of claim 4 including means movable with and operatively associated with the truck means for projecting a high pressure stream of washing fluid at the wheels of the vehicle as the spray bar rotates.

6. An automatic vehicle washing apparatus comprising a source of pneumatic pressure and means operatively connecting said source of pneumatic pressure with said vehicle washing apparatus for utilizing said pneumatic pressure for the operation of said vehicle washing apparatus;
   said source of pneumatic pressure being in pressurizing connection with a plurality of independent washing fluid supply systems;
   spray bar means for discharging washing fluids onto the surface of said vehicle, said independent washing fluid supply systems extending independently to and terminating in separate spray ports;
   said source of pneumatic pressure being in pressurizing connection with a pneumatically actuated means for moving said spray bar means along a reciprocal path longitudinally of said vehicle; and
   sensing means controllably connected with said pneumatically actuated means for automatically regulating the length of said path proportionate to about the length of the wheelbase of said vehicle, said path being convexly arcuate relative to said vehicle at either end of said vehicle and substantially linear between said convexly arcuate portions, and said vehicle being located between the arcuate portions of said path, said pneumatically actuated means including means for rotating said spray bar means while preventing longitudinal movement of said spray bar means to define the said convexly arcuate portions of said path over the respective ends of said vehicle and means for preventing said spray bar means from rotating while moving said spray bar means longitudinally along the said linear portion of said path.

7. A method of washing a vehicle which comprises:

positioning a vehicle within a path defined by the movement of a spray bar means longitudinally of said vehicle, said path being convexly arcuate relative to said vehicle at either end of said vehicle and substantially linear between said convexly arcuate portions;

automatically sensing the length of the wheelbase of said vehicle and adjusting the length of the linear portion of said path to about the length of said wheelbase;

moving said spray bar means along said path;

pivoting said spray bar means at each end of the said linear portion of said path; and pressurizing washing fluids and ejecting them from said spray bar means onto the surface of said vehicle as said spray bar means moves along said path.

8. A method of claim 7 including moving the spray bar means reciprocally along said path for a plurality of complete cycles while ejecting different washing fluids from said spray bar means during different cycles, said cycles including at least a washing cycle and a rinsing cycle.

9. A method of claim 7 including pneumatically regulating the movement of the spray bar means along the path.

* * * * *